US012585007B2

(12) United States Patent
Ravish Suvarna et al.

(10) Patent No.: US 12,585,007 B2
(45) Date of Patent: Mar. 24, 2026

(54) RECURSIVE DETERMINISTIC MAXIMUM LIKELIHOOD ESTIMATION OF DIRECTION OF ARRIVAL IN AUTOMOTIVE RADAR SENSING

(71) Applicant: NXP B.V., Eindhoven (NL)

(72) Inventors: Anusha Ravish Suvarna, Eindhoven (NL); Arie Geert Cornelis Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 252 days.

(21) Appl. No.: 18/394,386

(22) Filed: Dec. 22, 2023

(65) Prior Publication Data

US 2025/0208282 A1   Jun. 26, 2025

(51) Int. Cl.
| | |
|---|---|
| *G01S 13/42* | (2006.01) |
| *G01S 7/35* | (2006.01) |
| *G01S 13/58* | (2006.01) |
| *G01S 13/931* | (2020.01) |

(52) U.S. Cl.
CPC ............ *G01S 13/426* (2013.01); *G01S 7/354* (2013.01); *G01S 7/356* (2021.05); *G01S 13/584* (2013.01); *G01S 13/931* (2013.01)

(58) Field of Classification Search
CPC ........ G01S 7/354; G01S 13/584; G01S 7/356; G01S 13/42
See application file for complete search history.

(56) References Cited

U.S. PATENT DOCUMENTS

| | | | |
|---|---|---|---|
| 2022/0196798 A1* | 6/2022 | Chen ....................... G01S 7/354 |
| 2023/0152435 A1 | 5/2023 | Koppelaar et al. | |

FOREIGN PATENT DOCUMENTS

| | | | | |
|---|---|---|---|---|
| EP | 3425421 A1 * | 1/2019 | .......... G01S 13/878 |
| EP | 4345493 A1 | 4/2024 | |
| WO | 2021197875 | 10/2021 | |

OTHER PUBLICATIONS

U.S. Appl. No. 18/469,949, entitled "Method and Apparatus for Determination of Direction Of 1 Arrival Angle", filed Sep. 19, 2023.
Koppelaar, Arie et al.; "Sequential DoA estimation using Recursive DML"; 2024 21st European Radar Conference (EuRAD); Sep. 25-27, 2024, Paris, France; DOI: 10.23919/EuRAD61604.2024. 10734932.

(Continued)

*Primary Examiner* — Vladimir Magloire
*Assistant Examiner* — Peter Davon Doze

(57) ABSTRACT

Systems for processing radar signals to detect objects. A radar signal snapshot is generated. A hierarchical tree structure is generated using the snapshot signal, wherein each layer in the hierarchical tree structure is associated with a number of candidate objects and each node in the hierarchical tree structure is associated with a set of direction of arrival angles. For a first layer in the hierarchical tree structure, a first set of path variables is calculated and a subset of path extensions is determined using the path variables out of a set of path extensions that connect to nodes within the hierarchical tree structure associated with a second layer in the hierarchical tree structure. For a first path extension, a path metric associated with a first node in the second layer of the hierarchical tree structure is determined and a direction of arrival angle is determined.

20 Claims, 8 Drawing Sheets

(56)                          References Cited

OTHER PUBLICATIONS

Emtiyaz, M., Updating inverse of a Matrix When a Column is
Added/Removed, Feb. 28, 2008, https://emtiyaz.github.io/Writings/
OneCollnv.pdf (Accessed Apr. 11, 2022).
"Viterbi decoding", https://en.wikipedia.org/wiki/Viterbi_decoder
(Accessed Apr. 14, 2022).
"Sequential decoding", https://en.wikipedia.org/wiki/Sequential_
decoding (Accessed Apr. 12, 2022).
Fast Deterministic Maximum Likelihood Direction-of-Arrival esti-
mation for FMCW radar, NXP Invention Disclosure ID82296250,
Arie GC Koppelaar et.al. Filed: Feb. 11, 2021.
Christian Westhues et.al. "Low-Complexity Super Resolution Angle
Separation for Sparse Antenna Arrays Based on Frequency Domain
Maximum Likelihood". IEEE radar conference, Mar. 21-25, 2022.
Y. C. Pati, R. Rezaiifar and P.S. Krishnaprasad, "Orthogonal match-
ing pursuit: recursive function approximation with applications to
wavelet decomposition," Proceedings of 27th Asilomar Conference
on Signals, Systems and Computers, Pacific Grove, CA, USA,
1993, pp. 40-44 vol. 1, doi: 10.1109/ACSSC.1993.342465.
P. Heidenreich, "Antenna Array Processing: Autocalibration and
Fast High-Resolution Methods for Automotive Radar", Ph.D. The-
sis, TU Darmstadt, Jun. 2012.
"Gaussian Elimination", https://en.wikipedia.org/wiki/Gaussian_
elimination (Accessed Apr. 19, 2022).
Arie GC Koppelaar & Marco Bekooij, "Recursive Deterministic
Maximum Likelihood Estimation of Direction-of-Arrival Estima-
tion", NXP Invention Disclosure ID82325958, Filed: Jun. 25, 2022.

* cited by examiner

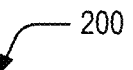
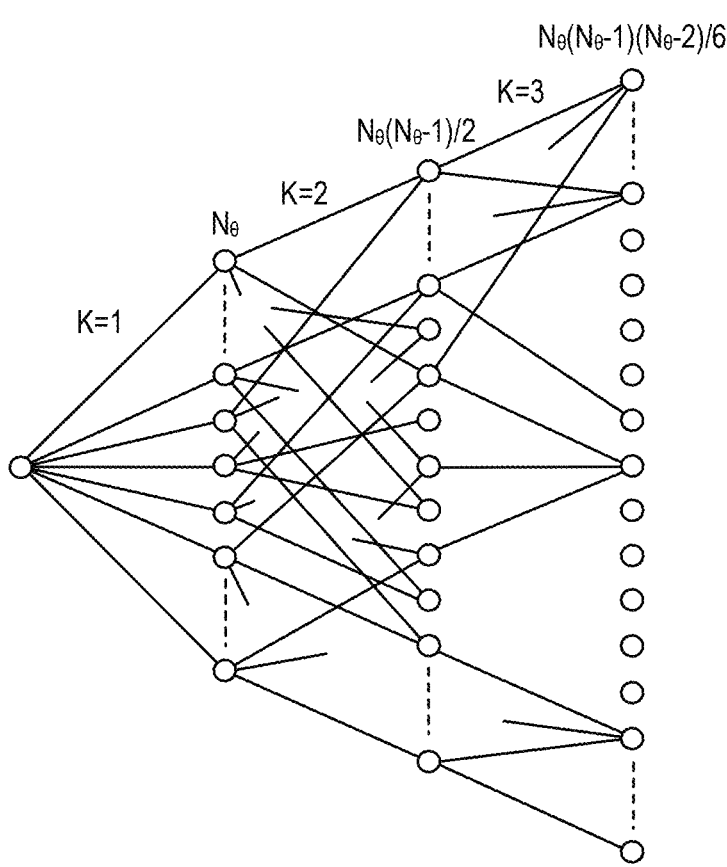
*FIG. 2*

400 —

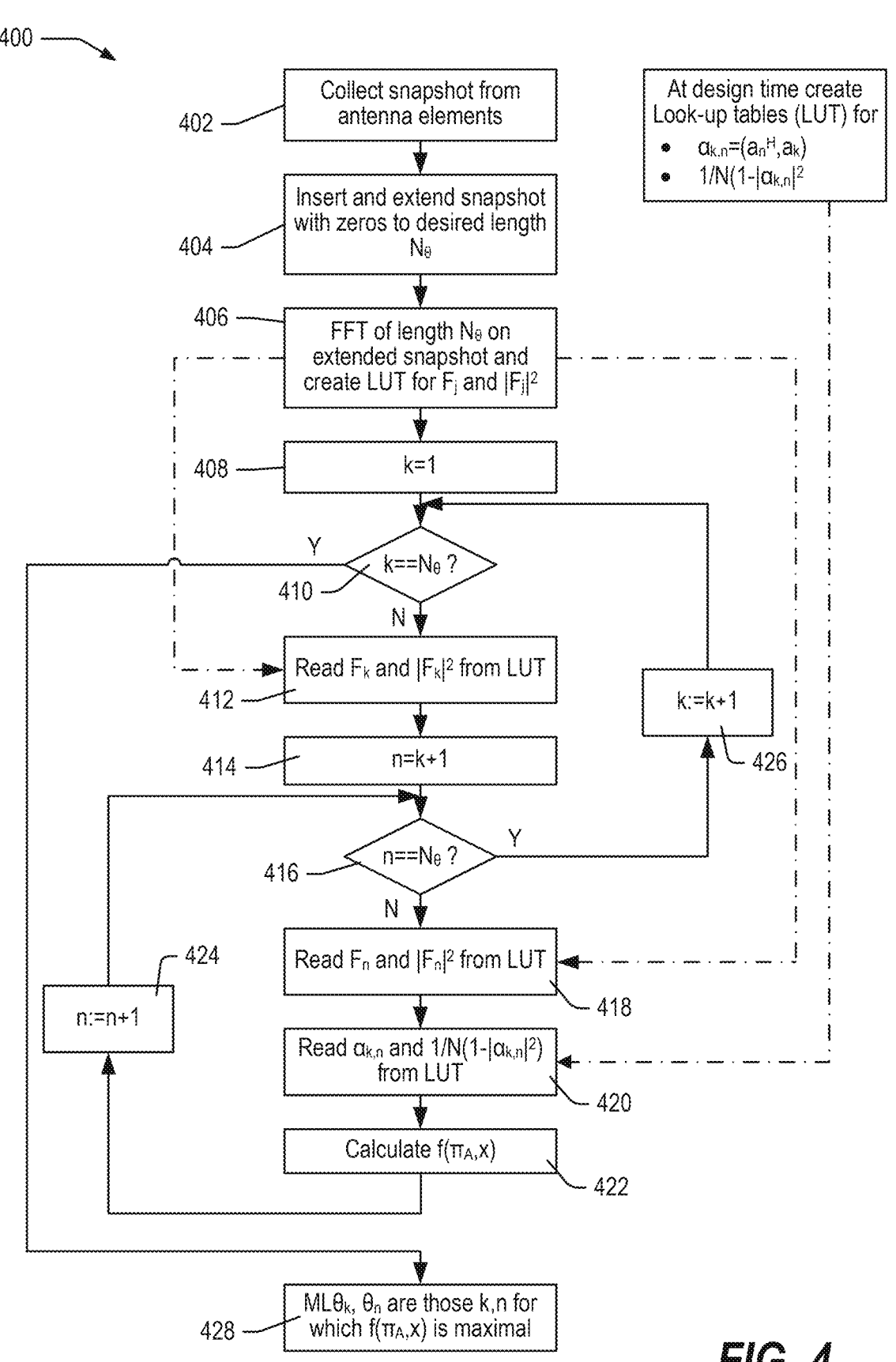

402 — Collect snapshot from antenna elements

At design time create Look-up tables (LUT) for
- $\alpha_{k,n}=(a_n{}^H, a_k)$
- $1/N(1-|\alpha_{k,n}|^2)$ 404 — Insert and extend snapshot with zeros to desired length $N_\theta$ 406 — FFT of length $N_\theta$ on extended snapshot and create LUT for $F_i$ and $|F_i|^2$ 408 — k=1

410 — k==$N_\theta$ ?    Y

N

412 — Read $F_k$ and $|F_k|^2$ from LUT

426 — k:=k+1

414 — n=k+1

416 — n==$N_\theta$ ?    Y

N

424 — n:=n+1

418 — Read $F_n$ and $|F_n|^2$ from LUT

420 — Read $\alpha_{k,n}$ and $1/N(1-|\alpha_{k,n}|^2)$ from LUT

422 — Calculate $f(\pi_A,x)$

428 — $ML\theta_k$, $\theta_n$ are those k,n for which $f(\pi_A,x)$ is maximal

*FIG. 4*

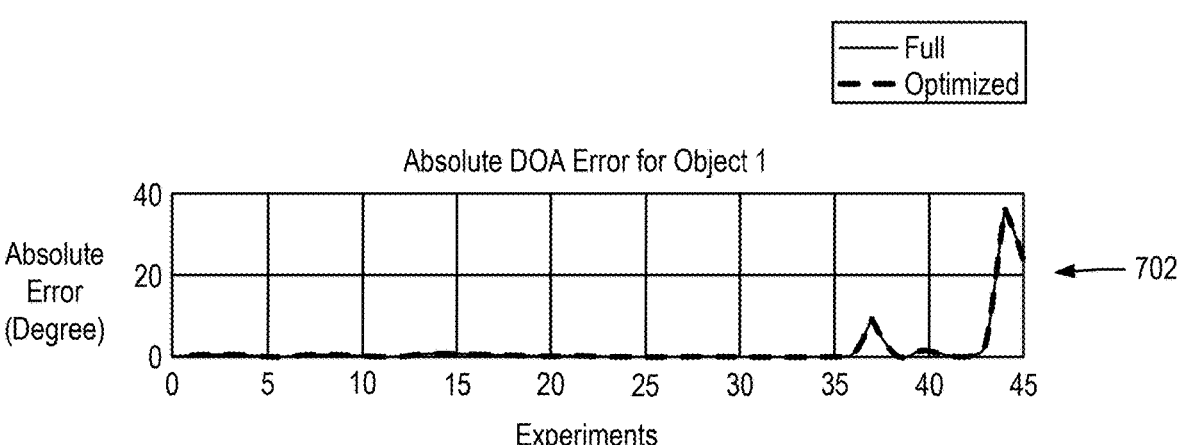
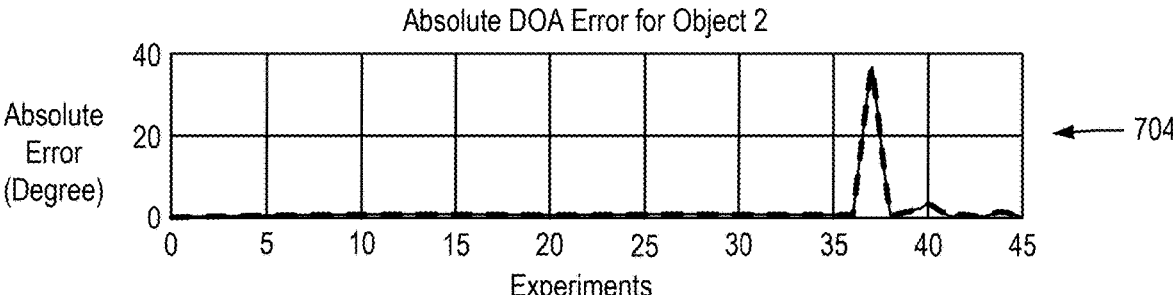
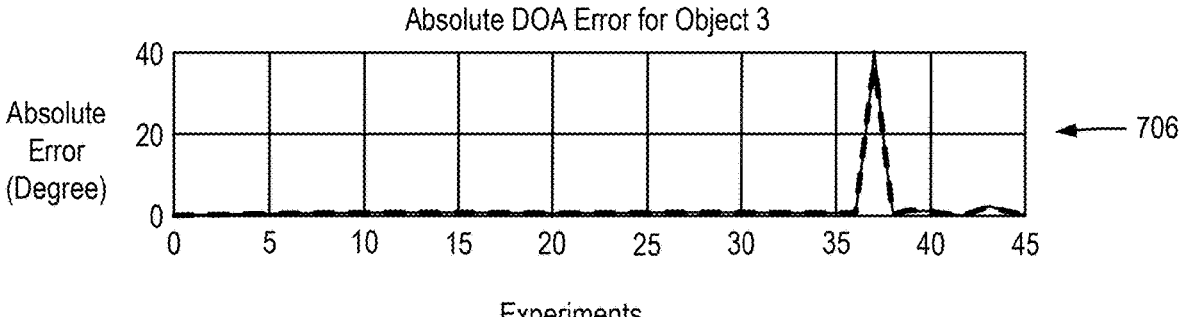
*FIG. 7*

RECURSIVE DETERMINISTIC MAXIMUM LIKELIHOOD ESTIMATION OF DIRECTION OF ARRIVAL IN AUTOMOTIVE RADAR SENSING

TECHNICAL FIELD

The present disclosure is directed in general to radar systems and associated methods of operation. In one aspect, the present disclosure relates to a radar system configured to execute a recursive and deterministic maximum likelihood estimation of direction of arrival information for objects observed by the radar system.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in automotive applications, automotive radar systems can be used to determine the distance and speed of arrival of oncoming vehicles and other obstacles. Automotive radar systems enable the implementation of advanced driver-assistance system (ADAS) functions that are likely to enable increasingly safe driving and, eventually, fully autonomous driving platforms. Such automotive platforms use radar systems as the primary sensor for ADAS operations.

During operations, radar systems are configured to detect objects within the vicinity of the radar system and, for the various detected objects, determine direction of arrival information. That information is supplied to the ADAS enabling improved operations.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 depicts a hierarchical tree in which each nodes represents a number of objects and angles of arrival that may be associated with objects present within a snapshot.

FIG. 4 is a flowchart depicting a method for implementing a dual object Fast-DML approach for DOA estimation.

FIGS. 6-8 are graphs depicting the performance of the present optimized R-DML approach in comparison with the conventional full search R-DML for DOA estimation.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Automotive radar systems are used to support advanced driver-assistance system (ADAS) functions like assisted cruise control, emergency braking, and blind spot monitoring and alerts. For these ADAS applications, objects are detected by automotive radar systems and information of those objects, such as their range, velocity, and direction of arrival are determined based upon radar signals being reflected by those objects.

Typically, frequency modulated continuous wave (FMCW) modulation radars are used to identify the distance, velocity, and/or direction of arrival of a radar object, such as a car or pedestrian, by transmitting Linear Frequency Modulation (LFM) waveforms from transmit antennas so that reflected signals from the radar object are received at receive antennas and processed to determine the radial distance, relative radial velocity, and angle (or direction) for the radar object.

Figure 1:
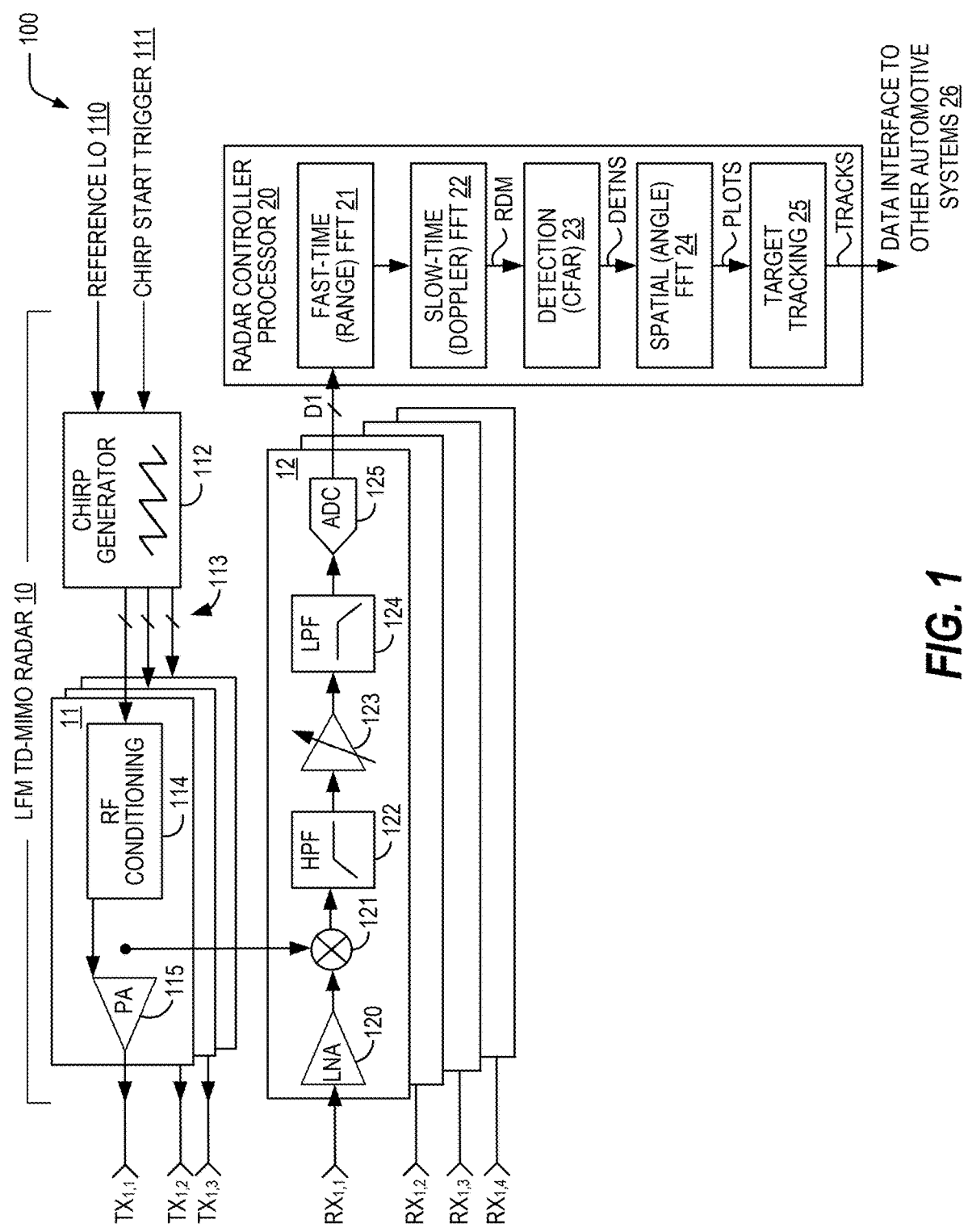
FIG. 1 depicts a simplified schematic block diagram of an automotive radar system.

To illustrate the design and operation of a radar system configured in accordance with the present disclosure, reference is now made to FIG. 1 which depicts a simplified schematic block diagram of automotive radar system 100. Automotive radar system 100 includes MIMO radar device 10 connected to a radar controller processor 20. In selected embodiments, MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits or chips or with a single chip, depending on the application.

Each radar device 10 includes one or more transmitting antenna elements TXi and receiving antenna elements RXj connected, respectively, to one or more radio frequency (RF) transmitter (TX) units 11 and receiver (RX) units 12. For example, each radar device (e.g., 10) is shown as including individual antenna elements (e.g., TX1,$i$, RX1,$j$) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12.

Each radar device 10 also includes a chirp generator 112 that is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna TX1,i and radiated. By sequentially using each transmit antenna TX1,i to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit TX1,i, TX2,i may be reflected by an object, and part of the reflected radar signal reaches the receiver antenna units RX1,i at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning module 114. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. In various embodiments, the receiver module compresses object echoes of various delay signals into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12.

In selected embodiments, the radar controller processing unit 20 may be embodied as a micro-controller unit (MCU) or other processing unit that is configured and arranged for signal processing tasks such as, but not limited to, object identification, computation of object distance, object velocity, and object direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences.

In addition, the radar controller processor 20 may be configured to program the modules 11 to operate in a time-division fashion by sequentially transmitting LFM chirps for coordinated communication between the transmit antennas TX1,i, RX1,j. The result of the digital processing at the radar controller processing unit 20 is that the digital domain signals D1 are processed for the subsequent fast-time range frequency Fourier transform (FFT) 21, slow-time FFT 22 for Doppler compression, constant false alarm rate (CFAR) object detection 23, spatial angle estimation 24, and object tracking processes 25, with the result being output 26 to other automotive computing or user interfacing devices for further process or display. When performing object detection, the radar controller processor 20 is configured to determine a range profile of the reflected radar signals, where peaks in the range profile are indicative of potential objects at known ranges.

During operation of automotive radar system 100, radar controller processor 20 transmits control signals to the various components of one or more radio frequency (RF) transmitter (TX) units 11 and receiver (RX) units 12 to control how the radar signals transmitted by automotive radar system 100 are the transmitted signals are shaped and how the received signals are processed. In a specific example, radar controller processor 20 is configured to modulate the power level of signals transmitted by the one or more radio frequency (RF) transmitter (TX) units 11 by transmitting control signal to power amplifier 115 of each of the one or more radio frequency (RF) transmitter (TX) units 11.

In an embodiment of the present system, a radar system (e.g., automotive radar system 100 of FIG. 1) has a field-of-view (FOV) defined by radar signals being transmitted (e.g., by one or more radio frequency (RF) transmitter (TX) units 11 of FIG. 1) and received (e.g., by one or more radio frequency (RF) receiver (RX) units 12) by the radar system that covers a particular region of interest. During operations, the radar system operates according to a sensing interval $\Delta t$ that defines the duration between two radar waveform transmissions used to perform object detection by the radar system. With these attributes, the controller of the radar can implement a method for power modulation in accordance with this disclosure.

FMCW radar systems, such as automotive radar system 100, are used to estimate the distance and relative velocity of objects in the vicinity of the radar system. Using several antennas to transmit and receive radar waveforms (e.g., antenna units connected to transmitter units 11 and receiver units 12) enables the estimation of additional information associated with the objects, such as the direction in which the object is located (angular position: azimuth and/or elevation), which is sometimes referred to as the direction of arrival (DOA) of the objects. In such an implementation, transmitted radar waveforms are reflected by a object. The reflected signal is received the radar system's various receive antenna units connected to receiver units 12. Depending upon the direction of arrival (DOA) of the object's reflected signals, different pathlengths between the various transmit antenna units, objects, and receive antenna units are realized, enabling the radar system to determine phase differences in the received signals. Analysis of these phase differences is carried out to estimate the DoA of a detected object.

Before the DoA processing is carried out, the radar signal received at the various receive antenna units is processed in such a fashion that objects detected at different distances (i.e., ranges) and with different (radial) velocities (i.e., Doppler values) are isolated with so-called Range-Doppler processing, which processes the received radar signal into a number of Range-Doppler subdivisions, referred to as bins. If, for a specific Range-Doppler bin (i.e., a specific range and velocity), one or more objects are detected, DoA processing is started by using the values of that Range-Doppler bin from all Transmit-Receive antenna combinations. The use of multiple transmit antennas and multiple receive antennas is called MIMO (Multiple Input Multiple Output) processing. With $N_T$ transmitters and $N_R$ receivers, for example, there are $N_T * N_R$ values per Range-Doppler bin. These various signal combinations generate a radar array that is equivalent to a single transmit radar with a virtual $N_T * N_R$ receiver array. The set of values that belong to one Range-Doppler bin is also called a snapshot.

If only one object is present in a particular Range-Doppler bin, DoA processing for that object can be performed using beamforming techniques. Specifically, a DoA spectrum is calculated by correlating the received snapshot with so-called beamsteering vectors. For each potential DoA angle, a correlation value is determined. The DoA angle having the largest absolute correlation value is then determined to be the most likely DoA angle for the object.

However, in situations in which two or more objects have similar distance and radial velocities, those two or more objects may be located within the same Range-Doppler bin. As such, the corresponding signal snapshot will be a linear combination of the signals associated with those these objects. Consequently, standard beamforming techniques can be inadequate in determining the DOAs of each individual object. As such, more advanced DoA estimation techniques may be required. An example of such a technique involves deterministic maximum likelihood, which is a robust and well performing DoA determination technique. A drawback with the deterministic maximum likelihood approach, though, is that the approach requires knowledge of the total number of objects present within a particular Range-Doppler bin for which snapshot is being analyzed. This information is required because existing deterministic maximum likelihood DOA techniques are, in essence, merely exhaustive methods to find the most likely set of objects.

In a radar system having a virtual antenna array with N elements, each Range-Doppler bin is associated with N values that are collectively called a snapshot. The snapshot can be represented with a vector $\underline{x}$. Assuming that reflection signals from K objects are represented in that snapshot (which is expressed herein as K objects being contained in a single Range-Doppler bin), each object has DoA angles $\theta_1$, $\theta_2$, . . . , $\theta_K$. The K objects can be represented with a beamsteering matrix A consisting of K beamsteering vectors $(\underline{a}_1, . . . , \underline{a}_K)$. A beamsteering vector is the expected response of a single object with amplitude 1 and is given by $$\underline{a}_n^T = \left(e^{j2\pi(d_1/\lambda)sin\theta_n}, e^{j2\pi(d_2/\lambda)sin\theta_n}, . . . , e^{j2\pi(d_N/\lambda)sin\theta_n}\right),$$

where $(d_1, . . . , d_N)$ are the relative positions of the virtual antenna elements. For example, with a MIMO scheme implemented using 2 transmitter antenna units that are separated from one another by $13\lambda/2$, and a receiver antenna unit array that is a Minimum Redundancy Array (MRA) with antenna spacing $(0, 1, 4, 6)\lambda/2$, the transmitter and receiver antenna units form a virtual antenna array with relative element positions $(d_1, . . . , d_8)=(0, 1, 4, 6, 13, 14, 17, 19)\lambda/2$. A signal amplitude vector s can then be constructed, which represents the complex amplitudes of the individual objects.

It is further assumed that any particular snapshot $\underline{x}$ is corrupted by antenna noise and that the noise is identical and independent and constitutes distributed zero-mean Gaussian noise with variance $\sigma^2$. Hence, the snapshot $\underline{x}=A\underline{s}+\underline{n}$. Because of the Gaussian noise assumption, the joint probability density function of the snapshot can be written as:

$$p(\underline{x}) = \frac{1}{\pi^N\sigma^{2N}}e^{-\frac{|\underline{x}-A\underline{s}|^2}{\sigma^2}} \text{ with } (\underline{n} = \underline{x} - A\underline{s})$$

The Maximum-Likelihood (ML) estimate of $\underline{s}$ and A can then be found by minimizing (mathematically, the maximization can be solved by differentiating $log(p(\underline{x}))$ with respect to s and by requiring equality to zero), as follows:

$$Q = |\underline{x} - A\underline{s}|^2$$

6

To solve this equation (i.e., to find the K most likely objects (DoAs) and their complex amplitude), a form of bootstrapping approach is followed. As such, assuming that A is known, it is possible to determine s by minimizing Q in the least square sense.

$$\hat{\underline{s}} = \left(A^H A\right)^{-1} A^H \underline{x}$$

This result is then substituted back into the expression for Q, such it is possible to determine Q, as follows:

$$Q = \underline{x}^H\left(I - \prod_A\right)\underline{x}, \text{ where } \prod_A = A\left(A^H A\right)^{-1}A^H$$

The matrix $\Pi_A$ is referred to as the projection onto the column space of A. Since, the beamsteering matrix A is a function of the K beamsteering DoA angles $\underline{\theta}=\theta_1, \theta_2, . . . , \theta_K$, the DML problem can be formulated as the search for a K-dimensional vector $\underline{\theta}$, as follows: $\underline{\theta}_{DML}$ argmin$_\theta$ Q An equivalent notation for Q is using the trace operator (Tr( )) is given by:

$$Q = \underline{x}^H\left(I - \prod_A\right)\underline{x} = Tr\left(\left(I - \prod_A\right)\underline{x}^H\underline{x}\right)$$

This expression enables the generalization to estimate the DoA angles using multiple snapshots. By using the sample covariance matrix $\hat{R}=E[\underline{x}^H\underline{x}]$ it is possible to obtain $$Q = Tr\left(\left(I - \prod_A\right)\hat{R}\right)$$

Instead of minimizing Q, the DML criterion can also be formulated as a maximizing criterion, defined as follows:

Single snapshot: $\underline{\theta}_{DML}=\text{argmax}_\theta \underline{x}^H\Pi_A\underline{x}=\text{argmax}_\theta Tr(\Pi_A \underline{x}^H\underline{x})$ Multi snapshot: $\underline{\theta}_{DML}=\text{argmax}_\theta Tr(\Pi_A\hat{R})$ In these expressions the DML objective function is equal to: $f(\Pi_A,x)=\underline{x}^H\Pi_A\underline{x}=Tr(\Pi_A \underline{x}^H\underline{x})$ or in case of multiple snapshots $f(\Pi_A,\hat{R})=Tr(\Pi_A\hat{R})$).

In preparing to execute the DML algorithm, a 1D search grid is defined that has a granularity that reflects the resolution and/or the wanted accuracy. $N_\theta$ discrete points are selected in the range $[-\pi/2, \pi/2]$. When the FOV of the radar system is less than 180 degrees, discrete points can be selected from a smaller grid.

With such a grid defined and when performing a search for K objects, the search space has size $$N_K = \binom{N_\theta}{K}.$$

For example, in executing a search for K=2 objects with a grid of size $N_\theta=256$, the number of discrete points to be investigated is equal to $N_K=\frac{1}{2} N_\theta (N_\theta-1)\sim215=32$ k. A simplified outline of the DML algorithm that may be executed given those conditions is as follows. The below algorithm is representative of the conventional DML algorithm which takes a brute force approach to DOA estimation requiring that all discrete points (i.e., all $N_K$ points) are investigated:

Coarse DML algorithm outline:

Step 1: For n=1:$N_K$,

Step 2: Select A=($a_1$, . . . , $a_K$)

Step 3: Calculate $\Pi_A$=A($A^H A$)$^{-1}$$A^H$ (projection operator signal space)

Step 4: Evaluate DML objective function f($\Pi_A$,x) (or f($\Pi_A$,$\hat{R}$))

Step 5: end

In the inner-loop (i.e., the 'FOR' portion of the algorithm above including steps 2, 3, and 4) illustrated above, it is important to keep track of the maximum value of the DML objective function. Each index n is uniquely associated with a set of beamsteering vectors and therefore also with a set of K DoA angles. The index n for which the DML objective function is maximal determines the Maximum-Likelihood estimate of the DoA of the K objects.

The complexity of the DML algorithm is determined by two factors. First, the size of the search space $N_K$ (which is typically very, very large—e.g., greater than 30,000 points—$N_K$ is linear with $N_\theta^K$, wherein $N_\theta$ is the grid size and K is the number of objects per snapshot to search for) and secondly the complexity needed to evaluate the DML objective function at one point in the K-dimensional space. $N_K$ is determined by wanted accuracy.

When implementing recursive DML, the DML objective function is equal to: f($\Pi_A$,$\underline{x}$)=$\underline{x}^H \Pi_A \underline{x}$, with $\Pi_A$=A($A^H A$)$^{-1}$$A^H$. Consequently, it is possible to write the DML objective function as: f($\Pi_A$,$\underline{x}$)=$\underline{x}^H$A($A^H A$)$^{-1}$$A^H \underline{x}$=$\underline{y}^H$($A^H A$)$^{-1}$$\underline{y}$, where $\underline{y}$=$A^H \underline{x}$. The interpretation of $\underline{y}$=$A^H \underline{x}$ is that $\underline{y}$ is the correlation of the snapshot with K beamsteering vectors. With this interpretation, the following steps can be implemented to reduce the complexity of the inner-loop of the DML algorithm, as set forth above:

Step 1: The correlation of the snapshot with all beamsteering vectors on the grid outside the inner-loop are correlated. K correlation values are selected on request in the inner-loop to construct $\underline{y}$. With this approach, the correlation of the snapshot with a beamsteering vector is done once outside the loop.

Step 2: By selecting an appropriate 1D search grid, the correlation with all beamsteering vectors on the grid can be performed with a zero-padded FFT of size $N_\theta$. The choice to do the correlation by means of FFT has the advantage that automatically a non-uniform grid of DoA angles is tested, with a denser grid for DoA's around θ=0 and a less dense grid for DoA's around θ=±π/2. A 2×4 MRA MIMO radar array, for example, leads to a non-uniform virtual array with 8 elements. As mentioned above, this virtual array has virtual elements at relative positions ($d_1$, . . . , $d_8$)=(0, 1, 4, 6, 13, 14, 17, 19)λ/2. The FFT can also be used to increase the density of the search grid by appending zeros after the last antenna element. A typical choice for the FFT length is $N_\theta$=256, such that the output of the FFT represents the correlation of the snapshot with $N_\theta$=256 beamsteering vectors.

Step 3. For small values of K (e.g. K=2 or 3), ($A^H A$)$^{-1}$ can be symbolically precalculated as a matrix of size K×K. Therefore, inversion of a K×K matrix may not be carried out in the inner loop of the DML algorithm and is instead replaced by substitution of the appropriate values in the symbolically pre-calculated matrix. For larger value of K, symbolically precalculating the matrix and substituting corresponding information may become impractical.

To illustrate, in an example involving dual objects, the beamsteering matrix A consists of 2 beamsteering vectors A=($\underline{a}_k$ $\underline{a}_n$). In the core of the DML algorithm an inverse of the matrix $A^H A$ is calculated. As suggested above in Step 3, this inverse can be determined symbolically, with the resulting inverse matrix being designated B, as follows.

$$B = \left(A^H A\right)^{-1} = \frac{1}{N\left(1 - |\alpha_{k,n}|^2\right)} \begin{pmatrix} 1 & -\alpha_{k,n}^* \\ -\alpha_{k,n} & 1 \end{pmatrix},$$

$$\text{where } \alpha_{k,n} = \frac{1}{N}\left(\underline{a}_n^H \underline{a}_k\right).$$

The value $\alpha_{k,n}$ is the in-product between 2 beamsteering vectors and can be calculated once for a specific array and stored in a Look-up-Table (LUT). In general, such a LUT will have size $N_\theta^2$, but the choice for using FFT results in $\alpha_{k,n}$ being a function of (k-n) and therefore the size of the LUT is linear with $N_\theta$. The size of the table has a gross length of $2N_\theta$ and by exploiting symmetries it is possible to reduce its size to $N_\theta/2$.

The DML search algorithm can then be represented using the tree 200 of FIG. 2. When executing object DOA estimation, if the number of objects are unknown, it is necessary to search for up to K objects using a search grid of $N_\theta$, then the tree structure with depth K represents the search space of all possible combinations of up to K objects. Every node in the tree 200 of FIG. 2 represents a possible set of candidate object DoA angles. In the 1st vertical layer (i.e., the K=1 layer), all possible sets of potential DOA angles for a single object are represented, at the 2nd vertical layer (i.e., K=2 layer) all possible combinations of DOA angles for 2 objects are represented by each node, and at the $K^{th}$ vertical layer, all possible DOA angle combinations are represented for K objects. The tree structure is used to keep track which sets of objects are explored with the DML objective function. A branch from the (K−1)th layer to the K-th layer represents the extension of a set of K−1 candidate object's DoA's with an extra candidate DoA.

The K=1 branch of tree 200 of FIG. 2 represents the calculation of the beamforming spectrum (i.e., the DML search) for a single object on search grid of size $N_\theta$. The $N_\theta$ nodes represent the $N_\theta$ values of the beamforming spectrum, which can be used to find the most likely object in the case of a single object being reflected in the received radar signal. The next layer in tree 200 of FIG. 2 (i.e., K=2) consists of ($_2^{N_\theta}$) nodes and therefore represents the DML objective function evaluated on all possible combinations of 2 DoA angles. In the prior-art DML search approaches, the search for K=1, K=2, K=3 is sequentially carried out in a brute-force fashion, with only re-use of the beamforming results as determined for K=1. Hence, the lines of tree 200 connected the K=2 and K=3 layers of tree 200 are not present in existing DML solutions. Hence, the search for K=2 and K=3 objects is carried out independently without re-use of previous calculations.

The prior-art tree traversal process (illustrated by FIG. 3 and described herein) is consequently called "depth-first" search in coding theory, because first the search in the tree is carried in the depth direction. With such a search, a promising path is extended in the depth of the tree, hence an evaluation of the DML objective function for K objects is followed by the evaluation of the DML objective function for (K+1) objects.

The Recursive DMLDoA estimation method is based on a recursive formulation of the DML objective function. Assume that the DML objective function is calculated for a set of DoA angles [$\theta_1$, $\theta_2$, . . . , $\theta_K$] (K objects) and the algorithm calls for calculating the DML objective for an extra object $\theta_{K+1}$. The K objects can be associated with K beamsteering vectors $A=[\underline{a}_1 \ldots \underline{a}_K]$ and the DML objective function can be calculated with $f(\Pi_A,\underline{x})=\underline{x}^H A(A^H A)^{-1} A^H \underline{x}=\underline{y}^H (A^H A)^{-1} \underline{y}=\underline{y}^H B \underline{y}$, where $\underline{y}=A^H \underline{x}$ and $B=(A^H A)^{-1}$. Further assume that B has been determined. The DML objective function can then be calculated for a set of DoA angles $[\theta_1, \theta_2, \ldots, \theta_K]$ including an extra object $\theta_{K+1}$, which is associated with an additional beamsteering vector $\underline{a}_{K+1}$. The set of beamsteering vectors can then be represented with a matrix $\tilde{A}=[A \ \underline{a}_{K+1}]$. B is calculated as $\tilde{B}=(\tilde{A}^H A)^{-1}$ by:

$$\tilde{B} = \begin{bmatrix} B + d\underline{c}\underline{c}^H & -d\underline{c} \\ -d\underline{c}^H & d \end{bmatrix}, \tag{1}$$

In equation (1), $$\underline{c} = B \ A^H \underline{a}_{K+1},$$

and $$d = \frac{1}{\underline{a}_{K+1}^H \underline{a}_{K+1} - \underline{a}_{K+1}^H A B A^H \underline{a}_{K+1}}.$$

The DML objective function can be calculated with $$f\left(\prod_{\tilde{A}}, \underline{x}\right) = \tilde{\underline{y}}^H \tilde{B} \tilde{\underline{y}}, \text{ where } \tilde{\underline{y}}^H = \begin{bmatrix} \underline{y}^H & y_{K+1}^* \end{bmatrix} \text{ and } y_{K+1} = \underline{a}_{K+1}^H \underline{x}$$

(this is the correlation of the received snapshot $\underline{x}$ with a $(K+1)$-th beamsteering vector $\underline{a}_{K+1}$). Substituting the former result generates:

$$\tilde{\underline{y}}^H \tilde{B} \tilde{\underline{y}} = \underline{y}^H B \underline{y} + d(|z|^2 - 2 \ Re\{z \ y_{K+1}\} + |y_{K+1}|^2), \tag{2}$$

In equation (2), $z=\underline{y}^H \underline{c}$. $\underline{y}^H B \underline{y}$ a is a Path Metric, $d(|z|^2-2 \ Re\{z \ y_{K+1}\}+|y_{K+1}|^2)$ is a Branch Metric and $\tilde{\underline{y}}^H \tilde{B} \tilde{\underline{y}}$ is the Path Metric of an extended path.

Specifically, each node in the tree is associated with a set of candidate object DoA angles. The value of the DML objective function can be calculated for each set of object DoA angles. To a particular node from the root (i.e., left-most) node in the tree, a path can be selected through the various nodes in the tree (thereby defining a path) to reach the particular node. In this way, a node can also be associated with a path in the tree. A such, the path metric can defined as the value of the DML objective function of the corresponding node. As shown in equation (2), above, the value of the DML objective function of a certain node can be written as the Path Metric of a previous node/path extended with an extra value. This extra value is referred to as the Branch Metric, and that value represents the change in the DML objective function when an extra object DoA is added to the set of candidate object DoA's. In this approach, a difference from conventional approaches (i.e., the Viterbi algorithm) is that the Viterbi algorithm is usually carried out on a trellis, while the present DoA estimation algorithm can be carried on a tree. Another difference is how path merges are dealt with. In the Viterbi algorithm the most likely path is selected as survivor in a node where these paths merge. However, for the present DoA estimation approaches, a merging path is a redundant calculation of the DML objective function, i.e., two merging paths will have the same value for the DML objective function because they represent the same set of candidate DoA angles. Therefore, the search on the tree should be organized in such a fashion that these redundant calculations are avoided.

This approach, therefore, enables a recursive approach for calculating a DML objective function. The approach can be used in a tree that describes all possible combinations of 1, 2, 3, . . . , etc DoA angles.

To provide further illustration, a conventional path extension algorithm 300 is described below and illustrated in the flowchart of FIG. 3. Specifically, in step 301, a depth variable is initialized to the value 1 indicating that the algorithm begins at depth 1 within the tree processing DOA estimation for a single object. In step 302, path extensions beyond node D into deeper nodes indicative of additional objects K are determined and evaluated. If the path extension results in success (step 304), path variables are updated (step 306), the depth counter D is incremented (step 308) and the method continues to step 310 where it is determined whether additional paths are available at the current level D. In this implementation, because the approach calls for recursively calculating the DML objective function and searching for the set of DoA angle's that maximizes the DML objective function, it is desirable to increase the value of the DML objective function when the set of candidate object DoA's is extended. As such, success, as utilized in step 308, is determined when the Branch Metric has a positive value. In some implementations, the definition of "success" may be further constrained by requiring that the Branch Metric be larger than some pre-defined positive value. This approach can help in noisy conditions to give favor to sparse solutions of the search: an explanation of the received snapshot with few candidate objects is more likely to be true than an explanation with many candidate objects.

If, however, in step 304 the path extension does not result in success, the method moves straight to step 310 to determine whether other paths are available to process at the current level D.

Figure 3:
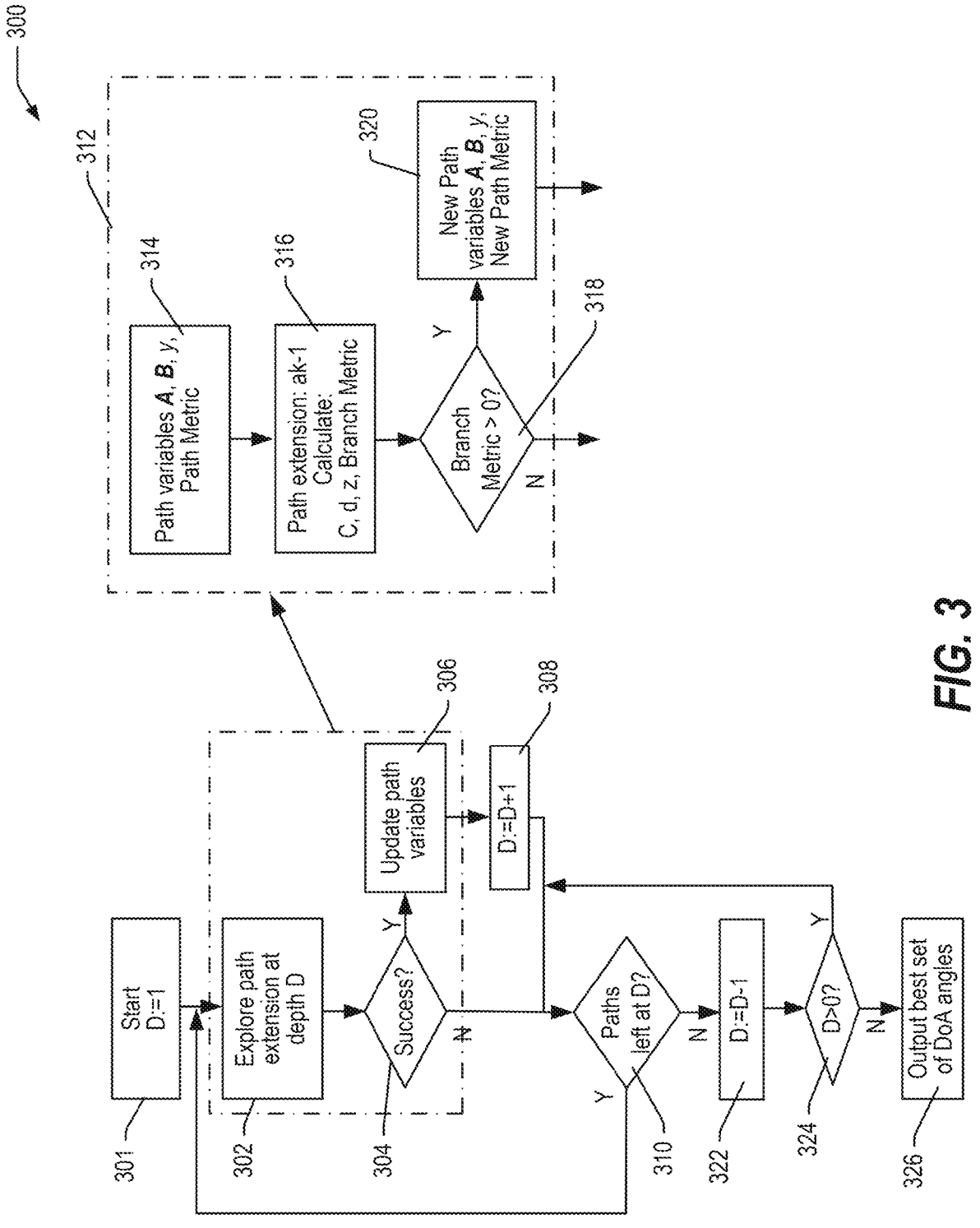
FIG. 3 is a flowchart depicting a conventional path extension algorithm utilized in determining a direction of arrival (DOA) associated with an object.

Within FIG. 3, inset 312 provides more detail for the loop including steps 302, 304, and 306. Specifically, within inset 312, steps 314 and 316 represents substeps of step 302. Specifically, in step 314 path variables A, B, $\underline{y}$, and the Path Metric for the current path are determined in a portion of step 302. In the second portion of step 302 (represented by step 316 of inset 312), a path extension $\underline{a}_{K+1}$ is selected and corresponding values $\underline{c}$, d, z, and Branch metric are calculated. Then, in step 318 (which corresponds to the "success" block of step 314) an evaluation is made of whether the Branch Metric exceeds a predetermined value $\lambda$. Generally, $\lambda$ has a non-negative value, which might be 0, but in order favor sparse solutions over non-sparse solutions $\lambda$ may have values greater than 0. If so, the evaluation is successful and the method moves to step 320 (which corresponds to step 306) in which new path variables A, B, $\underline{y}$, and a new Path Metric are determined for the successful path.

Accordingly, when executing step 302, it is presumed that the following values are known: 1) Path variable A (K beamsteering vectors representing the DoA angles that are hypothesized in the node, 2) Path variable B, 3) Path variable $\underline{y}$ (Correlation of snapshot with the K beamsteering vectors), and 4) the Path metric representing the FOM-metric of the path that ends in the current node. Additionally, according to a conventional path extension algorithm, the path will be extended with a DoA angle that is represented with a beamsteering vector $\underline{a}_{K+1}$. With the DoA angle of the path extension determined (e.g., via the determination of success step 304), the following calculations are performed unconditionally as part of step 302:

First, the calculation of $\underline{c} = B\ A^H \underline{a}_{K+1}$. Note that $A^H \underline{a}_{K+1}$ can be read from a Look-up-Table (LUT), they are the corresponding $\alpha_{k,n}$ values as defined before:

$$\alpha_{k,n} = \frac{1}{N} \left( \underline{a}_n^H \underline{a}_k \right).$$

Second, $$d = \frac{1}{\underline{a}_{K+1}^H \underline{a}_{K+1} - \underline{a}_{K+1}^H ABA^H \underline{a}_{K+1}}.$$

The part $B\ A^H\ \underline{a}_{K+1}$ is available from previous calculation, $$\underline{a}_{K+1}^H A$$

can also be read from the alpha LUT and $$\underline{a}_{K+1}^H \underline{a}_{K+1}$$

is equal to N.

Third, the calculation of $z = \underline{y}^H \underline{c}$.

And fourth, the calculation of the total branch metric $d(|z|^2 - 2\ Re\{z\ y_{K+1}\} + |y_{K+1}|^2) - \lambda$ Then, according to the conventional approach, if the total branch metric is smaller than 0) (as evaluated in step 304), the explored path extension is not promising and should be terminated. Another DoA angle will then be selected for processing in step 310 to potentially extend the path.

If, however, the branch metric is larger than 0 (as evaluated in step 304), then the path extension is determined to be 'promising' and the path variables and path metric are updated accordingly in step 306:

$$\tilde{A} = \begin{bmatrix} A & a_{K+1} \end{bmatrix}$$

$$\tilde{B} = \begin{bmatrix} B + d\ \underline{c}\underline{c}^H & -d\ \underline{c} \\ -d\ \underline{c}^H & d \end{bmatrix}$$

$$\tilde{\underline{y}}^H = \begin{bmatrix} \underline{y}^H & y_{K+1}^* \end{bmatrix}$$

Path Metric (new node) =

Path metric (old node) $+ d(|z|^2 - 2\ Re\{z\ y_{K+1}\} + |y_{K+1}|^2) - \lambda$ Along with these new path variables, the approach calls for calculating, for each node, a pseudo-spectrum. This can be done recursively as well. The pseudo-spectrum is the set of complex amplitudes that can be associated with the DoA angles that are hypothesized in a node, i.e., along with estimated DoA angles the pseudo-spectrum provides an estimate of the complex amplitudes of the objects. The pseudo-spectrum is given by $\underline{s} = B\ \underline{y}$. Accordingly, the pseudo-spectrum update after successful path extension is $\tilde{\underline{s}} = \tilde{B}\ \tilde{\underline{y}}$, which after substitution gives:

$$\tilde{\underline{s}} = \begin{pmatrix} \underline{s} - s\ \underline{c} \\ s \end{pmatrix}, \tag{3}$$

-continued where $$s = d(y - z^*).$$

To limit the number of calculations performed in this approach, it can be convenient to have a LUT available containing the values $$\alpha_{k,n} = \frac{1}{N} \left( \underline{a}_n^H \underline{a}_k \right).$$

These values depend on the used antenna array and the chosen search grid. This table can be a 1-Dimensional table when the DoA angles $\theta$ to search for are chosen on grid that is uniform in $\sin(\theta)$. Furthermore, the correlation of the received snapshot $\underline{x}$ with all possible beamsteering vectors can be carried out prior to the search in order to avoid recalculating these values multiple times during the search, i.e. the values $$y_k = \underline{a}_k^H \underline{x}$$

for each possible beamsteering vector $\underline{a}_k$ (and therefore DoA angle) can be calculated before the search starts (e.g. with use of FFT) and stored in a LUT such that they can be retrieved when a path extension has to be processed.

If, in step 310 it is determined that additional paths remain at depth D within the tree, the method returns to step 302 and a new path extension is designated for evaluation. In this manner, the algorithmic loop formed by step 302, 304, 306, and 308 causes the algorithm to follow successful path extensions down into deeper levels of the tree each time a promising path is identified at a particular level. As those paths become unsuccessful, step 322 moves the algorithm back into higher levels of the tree allowing different paths to be evaluated. Specifically, if in step 310 no paths remain at the current level D (e.g., the algorithm has identified a 'dead-end'), the method moves to step 322 in which the value of depth D is decremented to move the algorithm back higher in the tree to evaluate different paths.

In step 324 a determination is made as to whether the depth D is greater than zero. If so, paths may remain that require exploration. As such, the method moves back to step 310 to identify other paths for evaluation. If, however, in step 324 the current depth D is not greater than zero, that indicates the entire tree has been traversed and the method moves to step 326 in which the best set of DOA angles are output by the algorithm.

In the present disclosure an approach is presented that can optimize the number of nodes visited at each node in the recursive DML algorithm described above. In the conventional approach, at each node, a cost function is calculated for all possible node combinations. This can increase the number of nodes visited as the depth of the search increases. For example, for K=3 objects and $N_\theta$=128, 349,632 node visits are generated. In this disclosure a pre-processing approach is presented to reduce the number of nodes that needs to be visited, thus reducing the computation complexity of R-DML.

In the pre-processing step the concept of matching pursuit is used to determine the next best nodes to visit in the node tree. As explained in the steps above in R-DML a pseudo object spectrum can be calculated at every node using the formula:

$$\tilde{s} = \left( \frac{s - s\,c}{s} \right),$$

where $$s = d(y - z^*).$$

The pseudo object spectrum is a vector containing the estimated complex amplitudes of the objects detected so far. Using the pseudo spectrum, it is possible to apply matching pursuit to find the search space for the next node traversal in the depth of the tree as follows.

Assuming the $k^{th}$ node (where k is a unique identifier for a particular node) is being processed. The steering vectors corresponding to this $k^{th}$ node are extracted from the full beamsteering matrix A into a matrix $A_k$ (of size $[N \times N_k]$ where $N_k$ specifies the depth of the tree in which the current node being processed is located. $A_k$ is a new matrix constructed by selecting only the corresponding columns up to node k in the tree from the full matrix A, $\underline{a}$ is the new column vector added for node k to an existing $A_{k-1}$. If $N_k$=2 then $A_k$ consists of 2 beamsteering vectors that can be associated with the current node being process.

At that particular k-th node, the estimated objects and their complex amplitudes can be used to estimate what their respective contributions are to the received snapshot $\underline{x}$ (also called measurement vector). A residue or residual value $r_k$, which represents the energy remaining in the measurement vector after the estimated object's power has been subtracted, that remains in the snapshot after removing the contributions of the estimated objects and their complex amplitudes using the matrix $A_k$ is then calculated. Specifically, that residue can be calculated in two ways. The first approach is relative to the measurement vector or snapshot. In the second approach the residue is calculated relative to a previously calculated residue value. Both approaches are illustrated as follows:

$$\underline{r}_k = \underline{x} - A_k * \tilde{s}$$

$$\underline{r}_k = \underline{x} - [\, A_{k-1} \quad \underline{a}\,] * \begin{bmatrix} \underline{s} - s\underline{c} \\ s \end{bmatrix}$$

$$= \underline{x} - A_{k-1}(\underline{s} - s\underline{c}) - \underline{a}s$$

$$= \underline{x} - A_{k-1}\underline{s} + s(A_{k-1}\underline{c} - \underline{a})$$

$$= \underline{r}_{k-1} - s(\underline{a} - A_{k-1}\underline{c})$$

The latter part can be further reduced to $$\underline{r}_k = \underline{r}_{k-1} - s\underline{m}$$

where, $$\underline{m} = \left( I - A_{k-1} B A_{k-1}^H \right)\underline{a}$$

The vector $\underline{m}$ is calculated in the R-DML recursion step to determine the value $$d\left( d = \frac{1}{\underline{a}^H \underline{m}} \right).$$

The matched filter response (residual beamforming spectrum) for the residual snapshot is calculated as:

$$mf_k = A^H * \underline{r}_k \quad [N_\theta \times 1]$$

The energy in each value in the matched filter response is calculated as follows:

$$eta_k = \mathrm{abs}(mf_k)$$

The search space is determined by thresholding and picking only the top promising $N_s$ nodes from the $eta_k$ matched filter response vector. An approach to select the top promising nodes $N_s$ is presented below. The approach can be further optimized based on the array that is being used. In one approach, the selected values include $N_s$ values that are above the mean or average of all the values, which should work for all array types.

$$N_s = \text{find points such that } \left( eta_{n_s} > \mathrm{mean}(eta_k) \right) \text{ for each } n_s \text{ in } N_\theta \text{ space}$$

The above mentioned steps can be performed at each node to find the next best traversal path in the tree, thus reducing the total number of nodes that needs to be visited.

FIG. 4 is a flowchart depicting method 400 for implementing an optimized dual object DML approach for DOA estimation, called Fast-DML. Method 400 may be implemented by a vehicle radar system (e.g., vehicle radar system 100 of FIG. 1) configured to implement MIMO radar signal transmission, reception and processing. The radar system receives radar reflections signals (e.g., via receiver units 12 of automotive radar system 100), and processes those signals via various FFTs and other processor (e.g., using radar controller processor 20) to generate Range-Doppler maps where each location in the Range-Doppler maps is associated with a signal snapshot.

In step 402 a snapshot is selected from the processed signal received by received elements 12. In step 404, that snapshot can be extended by zero padding to increase the length of the snap shot to a desired length $N_\theta$.

In step 406, a FFT of length $N_\theta$ is executed on the extended snapshot. As a result of that transform the values $F_j$ and $|F_j|^2$ are determined and can be stored in a LUT reference against an identifier of the current snapshot for later use.

In step 408 a counter k, which identifies a particular path located at a particular depth K within the tree, is initialized to the value 1. In step 410 a determination is made as whether the value k is equal to the value $N_\theta$. If not, that indicates that that there are additional paths to check at that level. As such, the method moves to step 412 in which the F values for the current object number k (i.e., $F_k$ and $|F_k|^2$) are retrieved (e.g., from the LUT in which values were stored during step 406).

In step 414, a variable n is set to a value k+1. Variable n is used to explore all $N_\theta$ paths per node k. In step 416 a determination is made as to whether n is equal to $N_\theta$. If so, that indicates all paths have been evaluated and the inner loop formed by steps 418, 420, 422, and 424 is exited. If, however, n is not equal to (i.e., less than) $N_\theta$, the method proceeds to step 418 in which the F values for the current path number n (i.e., $F_n$ and $|F_k|^2$) are retrieved (e.g., from the LUT in which values were stored during step 406). In step 420, the values $\alpha_{k,n}$ and $1/N(1-|\alpha_{k,n}|^2)$ are determined. Typically these values are determined a priori at system design and are fixed for a particular radar system or a particular radar system design, which $\alpha_{k,n}=(\underline{a}_n^H,\underline{a}_k)$. In step 422, the DML objective function f( ) is calculated for the current object number k and the current path n as $f(\Pi_A,x)$ in which x is the current snapshot.

In step 424, the value n is incremented and the algorithmic loop of steps 416, 418, 420, and 422 is repeated until all paths have been processed the current object number k. Once all paths have been processed (i.e., the value n is equal to $N_\theta$), the method moves to step 426 in which the object counter is incremented and then the method moves to step 410.

In this manner, DML objective functions f(are calculated for every combination of 2 objects (up to a maximum of $N_\theta$ objects) and all paths n (up to a maximum of $N_\theta$ paths). At that point, the method moves to step 428 in which a determination is made as to which combination of k and n values resulted in the maximum value of the DML objective function f( ). At that time, the radar system can make a determination which 2 objects are the most likely ones explaining the received snapshot.

Figure 5:
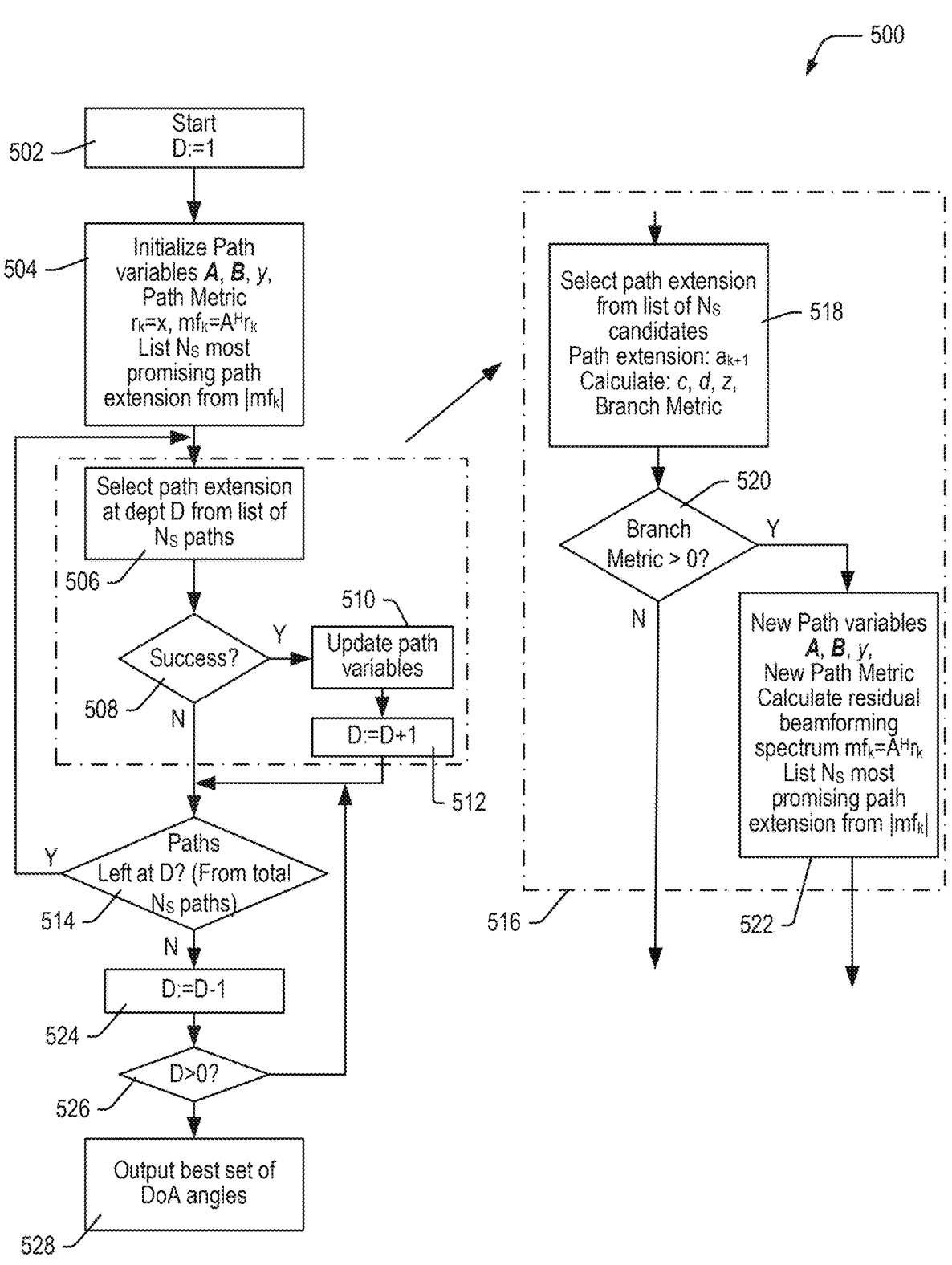
FIG. 5 is a flowchart depicting a method for implementing the present optimized recursive deterministic maximum likelihood (R-DML) approach for DOA estimation.

FIG. 5 is a flowchart depicting method 500 for implementing the proposed approach for optimized R-DML for DOA estimation. Method 500 may be implemented by a vehicle radar system (e.g., vehicle radar system 100 of FIG. 1) configured to implement MIMO radar signal transmission, reception and processing. The radar system receives radar reflections signals (e.g., via receiver units 12 of automotive radar system 100), and processes those signals via various FFTs and other processes (e.g., using radar controller processor 20) to generate Range-Doppler maps where each location in the Range-Doppler maps is associated with a signal snapshot. A snapshot is selected and, for the selected snapshot, a tree (i.e., of the form of tree 200 of FIG. 2) is generated that, in a hierarchical fashion, delineates different DOA angles for different combinations of numbers of objects. In the tree, each level of the tree (associated with a depth D) represent a different number of potential objects. At each level of the tree, each node represents a different combination of DOA angles for the each of the number of objects at that particular level.

In step 502, a depth variable is initialized to the value 1, indicating that the algorithm begins at depth 1 within the tree processing DOA estimation for a single object. In step 504, at the tree level D, variables are calculated for each potential path into deeper levels of the tree associated with additional potential objects. Specifically, the calculated path variables can include A (a beamsteering matrix that is initially an empty matrix), B (calculated pursuant to expression (1), above), y ($\underline{y}=A^H\underline{x}$), Path Metric (e./g., the DML objective function, which is initially a zero value), $r_k=x$ (initially no objects are hypothesized, so vector $r_k$ is initialized equal to the measurement vector=vector x), and $mf_k=A^H r_k$ (i.e., the matched filter output of vector $r_k$ with all beamsteering vectors that are present in the search grid, equivalently the beamforming spectrum of $r_k$).

With the path variables determined at the current level D within the tree, the $N_s$ most promising path extensions are listed from $eta_k=|mf_k|$, which may be determined by thresholding and picking only the top promising $N_s$ nodes from the $eta_k$ matched filter response vector. At step 506, a path extension beyond level D in the tree into deeper nodes indicative of additional objects K is selected out of the set of $N_s$ promising paths.

If the selected path extension results in success (step 508), path variables are updated (step 510), the depth counter D is incremented (step 512) and the method continues to step 514 where it is determined whether additional paths are available at the current level D (which has just been incremented).

Because the approach calls for recursively calculating the DML objective function and searching for the set of DoA angle's that maximizes the DML objective function, it is desirable to increase the value of the DML objective function when the set of candidate object DoA's is extended. As such, success, as utilized in step 508, is determined when the Branch Metric has a positive value. In some implementations, the definition of "success" may be further constrained by requiring that the Branch Metric be larger than some pre-defined positive value. This approach can help in noisy conditions to give favor to sparse solutions of the search: an explanation of the received snapshot with few candidate objects is more likely to be true than an explanation with many candidate objects.

If, however, in step 508 the path extension does not result in success, the method moves straight to step 514 to determine whether other paths are available to process at the current level D.

Within FIG. 5, inset 516 provides more detail for the loop including steps 506, 508, and 510. Specifically, within inset 516, step 518 provides more detail for step 506. Specifically, as reflected by step 518, A path extension $a_{K+1}$ is selected from the set of paths $N_s$ and, for the selected path extension, the values $\underline{c}$, d, z, and the Branch Metric are calculated.

Then, in step 520 (which corresponds to the "success" block of step 508) an evaluation is made of whether the Branch Metric for the current selected path extension exceeds a predetermined value λ (the specific value '0' is used In FIG. 5). Generally, λ has a non-negative value, which might be 0, but in order favor sparse solutions over non-sparse solutions λ may have values greater than 0. If the value λ is exceeded, the evaluation is successful and the method moves to step 522 (which corresponds to step 510) in which values of the path variables, which include A, B, $\underline{y}$ ($\underline{y}=A^H\underline{x}$), Path Metric, $\underline{r}_k=\underline{x}-A_k{}^*\underline{s}$, and $mf_k=A^H \underline{r}_k$ are updated. With the path variables updated at the current level D within the tree, the $N_s$ most promising path extensions are listed from $|mf_k|$, which may be determined by thresholding and picking only the top promising $N_s$ nodes from the $eta_k$ matched filter response vector.

When executing step 506, it is presumed that the following values are known: 1) Path variable A (K beamsteering vectors representing the DoA angles that are hypothesized in the node, 2) Path variable B, 3) Path variable y (Correlation of snapshot with the K beamsteering vectors), and 4) the Path metric representing the FOM-metric of the path that ends in the current node. The path will be extended with a DoA angle that is represented with a beamsteering vector K+1.

With the DoA angle of the selected path extension determined (e.g., via the determination of success step 508), the following calculations are performed unconditionally as part of step 518:

First, the calculation of $\underline{c}=B A^H\underline{a}_{K+1}$. Note that $A^H\underline{a}_{K+1}$ can be read from a Look-up-Table (LUT), they are the corresponding $\alpha_{k,n}$ values as defined before:

$$\alpha_{k,n} = \frac{1}{N}\left(\underline{a}_n^H \underline{a}_k\right).$$

Second, $$d = \frac{1}{\underline{a}_{K+1}^H \underline{a}_{K+1} - \underline{a}_{K+1}^H ABA^H \underline{a}_{K+1}}.$$

The part B $A^H \underline{a}_{K+1}$ is available from previous calculation, $$\underline{a}_{K+1}^H A$$

can also be read from the alpha LUT and $$\underline{a}_{K+1}^H \underline{a}_{K+1}$$

is equal to N.

Third, the calculation of $z = \underline{y}^H \underline{c}$.

And fourth, the calculation of the total branch metric $d(|z|^2 - 2\,Re\{z\,y_{K+1}\} + |y_{K+1}|^2) - \lambda$ If, the determined branch metric for the selected path extension results in success (evaluated in step 508), then the selected path extension is determined to be 'promising' and the path variables and path metric are updated accordingly in step 510:

$$\tilde{A} = \begin{bmatrix} A & \underline{a}_{K+1} \end{bmatrix}$$

$$\tilde{B} = \begin{bmatrix} B + d\,\underline{c}\underline{c}^H & -d\,\underline{c} \\ -d\,\underline{c}^H & d \end{bmatrix}$$

$$\tilde{\underline{y}}^H = \begin{bmatrix} \underline{y}^H & y_{K+1}^* \end{bmatrix}$$

Path Metric (new node) =

Path metric (old node) $+ d(|z|^2 - 2\,Re\{z\,y_{K+1}\} + |y_{K+1}|^2) - \lambda$ Along with these new path variables, the approach calls for calculating the residual beamforming spectrum $mf_k = A^H \underline{r}_k$. The set of promising path extensions is then determined as the set $N_s$ determined, as described herein, using $|mf_k|$.

In this manner, the set of path extensions to be explored (i.e., $N_S$) is constrained to only include path extensions with sufficient residual energy (i.e., the magnitude of the vector remaining after the estimated object's power, determined by the current selected path, has been subtracted) to warrant exploration. This approach, therefore, is more efficient than the conventional approach illustrated in FIG. 3 in which all potential paths are explored in all selected path extensions.

Returning to FIG. 5, in step 514 it is determined whether additional paths remain at depth D within the tree, the method returns to step 506 and a new path extension is selected out of the constrained set $N_S$ for evaluation. In this manner, the algorithmic loop formed by steps 506, 508, 510, and 512 causes the algorithm to follow successful path extensions selected out of the constrained set $N_S$ down into deeper levels of the tree each time a promising path is identified at a particular level. As those paths become unsuccessful, step 516 moves the algorithm back into higher levels of the tree allowing different paths to be evaluated.

Specifically, if in step 514 no paths remain at the current level D (e.g., the algorithm has identified a 'dead-end'), the method moves to step 524 in which the value of depth D is decremented to move the algorithm back higher in the tree to evaluate different paths.

In step 526 a determination is made as to whether the depth D is greater than zero. If so, paths may remain that require exploration. As such, the method moves back to step 514 to identify other paths for evaluation. If, however, in step 526 the current depth D is not greater than zero, that indicates the promising paths (selected out of the set $N_S$) of the tree (and not the entire tree as is called for in the method of FIG. 3) has been traversed and the method moves to step 528 in which the best set of DOA angles are output by the algorithm.

Figure 6:
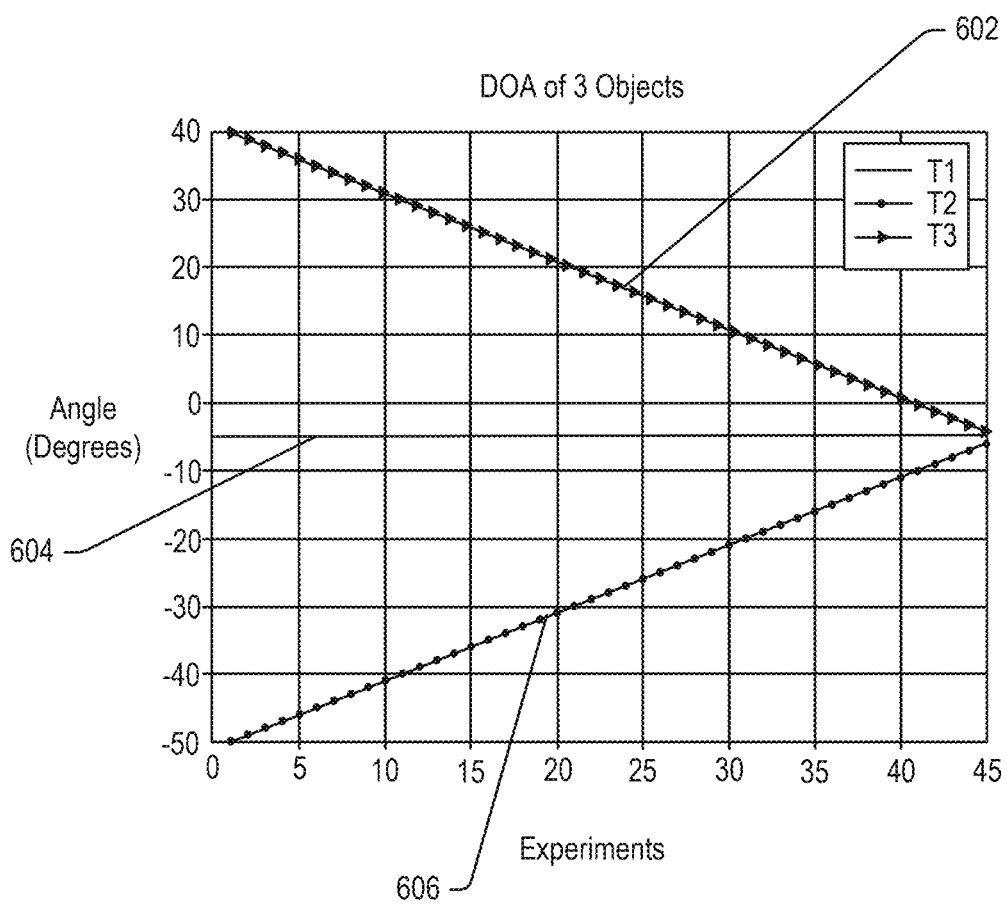
Figure 8:
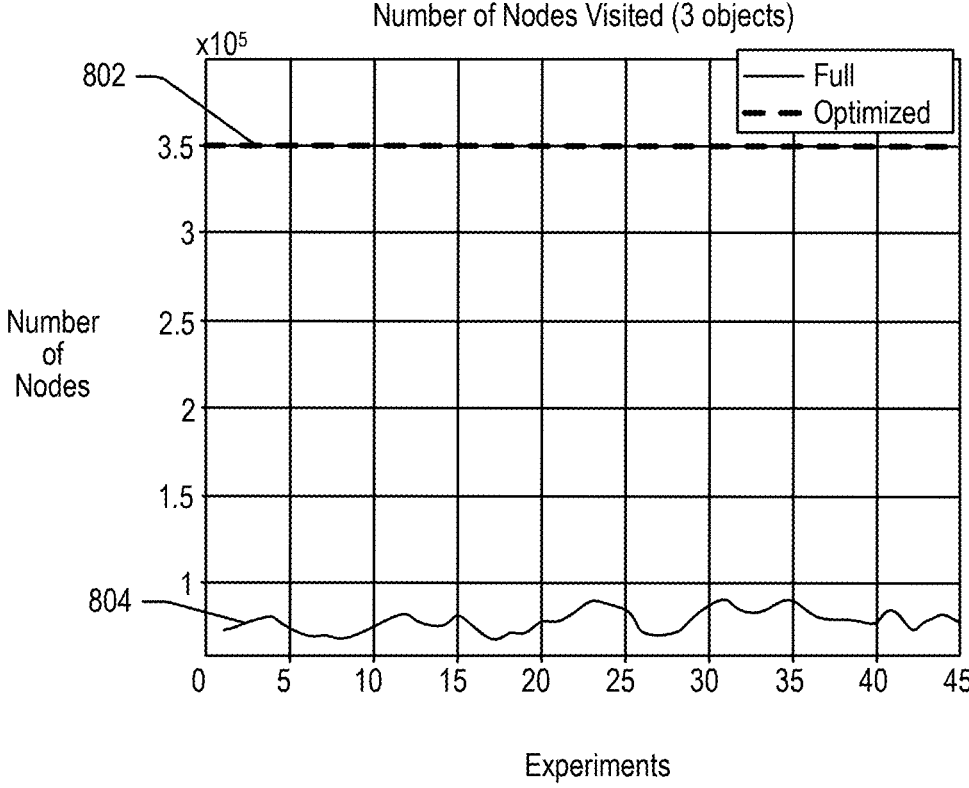

To illustrate the performance of the present approach for R-DML, FIGS. 6-8 are graphs depicting the performance of the present optimized R-DML approach in comparison with the conventional full search R-DML for DOA estimation. In FIG. 6, the horizontal axis represents a number of experiments that are carried out to test the performance of the proposed method and the vertical axis represents DOA angle. The traces 602, 604, and 606 shown in FIG. 6 depict the ground truth of three objects in each experiment. In this example, Object 2, represented by trace 604 is kept constant, object 1 (trace 602) and object 3 (trace 606) are moved close to object 2 (trace 604) in steps of 1 degree for each experiment.

FIG. 7 depicts the error in DOA estimate for the 3 objects represented in FIG. 6 using both a conventional full search R-DML and the optimized R-DML process of the present disclosure. Specifically, chart 702 represents the error in DOA estimate for the object represented by trace 602 of FIG. 6. Chart 704 represents the error in DOA estimate for the object represented by trace 604 of FIG. 6. Chart 706 represents the error in DOA estimate for the object represented by trace 602 of FIG. 6.

Within charts 702, 704, and 706 the solid line represents DOA algorithm errors when executing a full search. The dashed lines represent the DOA algorithm errors when executing a partial search optimized in accordance with the present disclosure. It can be observed that the error seen is similar for both approaches indicating that there is no considerable performance degradation with the reduced search space of the present disclosure.

FIG. 8 is a chart depicting the number of nodes visited by the conventional exhaustive R-DML approach and the present optimized reduced search space approach. The horizontal axis of the graph of FIG. 8 represents number of experiments and the vertical axis represents the number of nodes visited. Trace 802 represents the number of nodes visited by the conventional algorithm, while trace 804 represents the number of nodes visited by the resent optimized R-DML approach. As illustrated by FIG. 8, the number of nodes visited is reduced by ~4.5 times in comparison with R-DML algorithm without any pre-processing step. The error slightly increases for both R-DML and optimized R-DML as the 3 objects move very close to each other.

In some aspects, the techniques described herein relate to an automotive radar system, including: at least one transmitter and at least one receiver, wherein the at least one transmitter and the at least one receiver are configured to transmit and receive radar signals, wherein the at least one transmitter and the at least one receiver are coupled to a vehicle; and an automotive radar processor, configured to: transmit, at a first time, a first radar signal, receive, using the at least one receiver, a received signal, process the received signal to generate a plurality of snapshot signals, wherein each snapshot signal in the plurality of snapshot signals is associated with a range-Doppler bin, and execute a direction of arrival analysis of a first snapshot signal of the plurality of snapshot signals, including steps of: determining a hierarchical tree structure, wherein each layer in the hierarchical tree structure is associated with a number of candidate objects and each node in the hierarchical tree structure is associated with a set of direction of arrival angles for the number of candidate objects determined by the layer of the hierarchical tree structure in which the node is located, selecting a first layer in the hierarchical tree structure, calculating, for the first layer in the hierarchical tree structure, a first set of path variables, wherein the first set of path variables includes a residue value and a matched filter response vector based upon the residue value, determining a subset of path extensions using the matched filter response vector out of a set of path extensions that connect to nodes within the hierarchical tree structure associated with a second layer in the hierarchical tree structure, wherein the second layer is associated with one more candidate object than the first layer, and determine, for a first path extension out of the subset of path extensions, a path metric associated with a first node in the second layer of the hierarchical tree structure, and determining a direction of arrival angle for a first candidate object associated with the first node using the path metric.

In some aspects, the techniques described herein relate to an automotive radar system, wherein determining the subset of path extensions includes determining path extensions associated with matched filter response vectors having values greater than an average of all matched filter response vectors associated with nodes in the first layer of the hierarchical tree structure.

In some aspects, the techniques described herein relate to an automotive radar system, wherein the automotive radar processor is configured to determine a beamforming spectrum of the residue value.

In some aspects, the techniques described herein relate to an automotive radar system, wherein the automotive radar processor is configured to zero pad the first snapshot signal to length $N\theta$ and process the first snapshot signal using a fast Fourier transform of length $N\theta$, and $N\theta$ defines a grid size of the direction of arrival analysis.

In some aspects, the techniques described herein relate to an automotive radar system, wherein the automotive radar processor is further configured to: determine the first path extension is associated with a value in the matched filter response vector that is greater than values in the matched filter response vector associated with other path extensions in the subset of path extensions; calculating, for the second layer in the hierarchical tree structure, a second set of path variables, wherein the second set of path variables includes a residue value and a matched filter response vector based upon the residue value; and determining a second subset of second path extensions using the matched filter response vector out of a second set of path extensions that connect to nodes within the hierarchical tree structure associated with a third layer in the hierarchical tree structure and are associated with the first node in the second layer.

In some aspects, the techniques described herein relate to an automotive radar system, wherein the automotive radar processor is configured to determine, for each path extension in the subset of path extensions, path metric value.

In some aspects, the techniques described herein relate to an automotive radar system, wherein the path metric values are determined by the deterministic maximum likelihood (DML) objective function of a node in the first layer that is associated with a corresponding path extension.

In some aspects, the techniques described herein relate to an automotive radar system, wherein the automotive radar processor is configured to determine the path metric values associated with the path extensions in the subset of path extension each exceed a threshold value.

In some aspects, the techniques described herein relate to a radar system, including: a processor; and a memory storing instructions that, when executed by the processor, cause the processor to perform steps including: processing a received radar signal to generate a snapshot signal; determining a hierarchical tree structure using the snapshot signal, wherein each layer in the hierarchical tree structure is associated with a number of candidate objects and each node in the hierarchical tree structure is associated with a set of direction of arrival angles; calculating, for a first layer in the hierarchical tree structure, a first set of path variables; determining a subset of path extensions using the path variables out of a set of path extensions that connect to nodes within the hierarchical tree structure associated with a second layer in the hierarchical tree structure; determining, for a first path extension out of the subset of path extensions, a path metric associated with a first node in the second layer of the hierarchical tree structure; and determining a direction of arrival angle for a first candidate object associated with the first node using the path metric.

In some aspects, the techniques described herein relate to a radar system, wherein processor is further configured to determine a beamforming spectrum of a residue value using the first set of path variables.

In some aspects, the techniques described herein relate to a radar system, wherein the processor is further configured to: determine the first path extension is associated with a value in the matched filter response vector that is greater than values in the matched filter response vector associated with other path extensions in the subset of path extensions; calculating, for the second layer in the hierarchical tree structure, a second set of path variables, wherein the second set of path variables includes a residue value and a matched filter response vector based upon the residue value; and determining a second subset of second path extensions using the matched filter response vector out of a second set of path extensions that connect to nodes within the hierarchical tree structure associated with a third layer in the hierarchical tree structure and are associated with the first node in the second layer.

In some aspects, the techniques described herein relate to a radar system, wherein the processor is configured to determine, for each path extension in the subset of path extensions, path metric value.

In some aspects, the techniques described herein relate to a radar system, wherein the path metric values are determined by the deterministic maximum likelihood (DMVIL) objective function of a node in the first layer that is associated with a corresponding path extension.

In some aspects, the techniques described herein relate to a radar system, wherein the processor is configured to determine the path metric values associated with the path extensions in the subset of path extension each exceed a threshold value.

In some aspects, the techniques described herein relate to a radar system, wherein the processor is configured use direct correlation of beamsteering vectors to process the first snapshot signal.

In some aspects, the techniques described herein relate to a method, including: processing a received signal to generate a plurality of snapshot signals, wherein each snapshot signal in the plurality of snapshot signals is associated with a range-Doppler bin, determining a hierarchical tree structure, wherein each layer in the hierarchical tree structure is associated with a number of candidate objects and each node in the hierarchical tree structure is associated with a set of direction of arrival angles for the number of candidate objects determined by the layer of the hierarchical tree structure in which the node is located, selecting a first layer in the hierarchical tree structure, calculating, for the first layer in the hierarchical tree structure, a first set of path variables, wherein the first set of path variables includes a residue value and a matched filter response vector based upon the residue value, determining a subset of path extensions using the matched filter response vector out of a set of path extensions that connect to nodes within the hierarchical tree structure associated with a second layer in the hierarchical tree structure, wherein the second layer is associated with one more candidate object than the first layer, and determining, for a first path extension out of the subset of path extensions, a path metric associated with a first node in the second layer of the hierarchical tree structure; and determining a direction of arrival angle for a first candidate object associated with the first node using the path metric.

In some aspects, the techniques described herein relate to a method, wherein determining the subset of path extensions includes determining path extensions associated with matched filter response vectors having values greater than an average of all matched filter response vectors associated with nodes in the first layer of the hierarchical tree structure.

In some aspects, the techniques described herein relate to a method, further including: determining the path variables include a beamsteering matrix; and calculating the matched filter response vector using the expression AH rk in which is rk the residue value and A is a beamsteering matrix.

In some aspects, the techniques described herein relate to a method, further including zero-padding the first snapshot signal to length NO and processing the first snapshot signal using a fast Fourier transform of length NO, wherein NO defines a grid size of the direction of arrival analysis.

In some aspects, the techniques described herein relate to a method, further including: determining the first path extension is associated with a value in the matched filter response vector that is greater than values in the matched filter response vector associated with other path extensions in the subset of path extensions; calculating, for the second layer in the hierarchical tree structure, a second set of path variables, wherein the second set of path variables includes a residue value and a matched filter response vector based upon the residue value; and determining a second subset of second path extensions using the matched filter response vector out of a second set of path extensions that connect to nodes within the hierarchical tree structure associated with a third layer in the hierarchical tree structure and are associated with the first node in the second layer.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A radar system, comprising:
a processor; and
a memory storing instructions that, when executed by the processor, cause the processor to:
    process a received radar signal to generate a snapshot signal; and
    execute a direction of arrival analysis of the snapshot signal to determine a direction of arrival of an object by:
        determining a hierarchical tree structure using the snapshot signal, wherein each layer in the hierarchical tree structure is associated with a number of candidate objects and each node in the hierarchical tree structure is associated with a set of direction of arrival angles;

calculating, for a first layer in the hierarchical tree structure, a first set of path variables, wherein the first set of path variables includes a residue value and a matched filter response vector based upon the residue value;

determining, using the first set of path variables, a subset of path extensions out of a set of path extensions that connect to nodes associated with a second layer in the hierarchical tree structure by identifying path extensions associated with matched filter response vectors having values greater than a threshold value;

determining, for a first path extension out of the subset of path extensions, a path metric associated with a first node in the second layer of the hierarchical tree structure; and determining a direction of arrival angle for a first candidate object associated with the first node using the path metric.

2. The radar system of claim 1, wherein the processor is further configured to:

determine the first path extension is associated with a value in the matched filter response vector that is greater than values in the matched filter response vector associated with other path extensions in the subset of path extensions;

calculating, for the second layer in the hierarchical tree structure, a second set of path variables, wherein the second set of path variables includes a residue value and a matched filter response vector based upon the residue value; and determining a second subset of second path extensions using the matched filter response vector out of a second set of path extensions that connect to nodes within the hierarchical tree structure associated with a third layer in the hierarchical tree structure and are associated with the first node in the second layer.

3. The radar system of claim 1, wherein the threshold value is an average value of all matched filter response vectors associated with nodes in the first layer of the hierarchical tree structure.

4. The radar system of claim 3, wherein path metric values are determined by a deterministic maximum likelihood (DML) objective function of a node in the first layer that is associated with a corresponding path extension.

5. The radar system of claim 1, wherein the processor is configured to zero pad the snapshot signal to length $N_\theta$ and process the snapshot signal using a fast Fourier transform of length $N_\theta$, wherein $N_\theta$ defines a grid size of the direction of arrival analysis.

6. The radar system of claim 1, wherein the snapshot signal is associated with a range-Doppler bin of a range-Doppler matrix generated using the received radar signal.

7. An automotive radar system, comprising:

at least one transmitter and at least one receiver, wherein the at least one transmitter and the at least one receiver are configured to transmit and receive radar signals, wherein the at least one transmitter and the at least one receiver are coupled to a vehicle; and an automotive radar processor, configured to:

transmit, at a first time, a first radar signal, receive, using the at least one receiver, a received signal, process the received signal to generate a plurality of snapshot signals, wherein each snapshot signal in the plurality of snapshot signals is associated with a range-Doppler bin, and execute a direction of arrival analysis of a first snapshot signal of the plurality of snapshot signals, including steps of:

determining a hierarchical tree structure, wherein each layer in the hierarchical tree structure is associated with a number of candidate objects and each node in the hierarchical tree structure is associated with a set of direction of arrival angles for the number of candidate objects determined by the layer of the hierarchical tree structure in which the node is located, selecting a first layer in the hierarchical tree structure, calculating, for the first layer in the hierarchical tree structure, a first set of path variables, wherein the first set of path variables includes a residue value and a matched filter response vector based upon the residue value, determining a subset of path extensions using the matched filter response vector out of a set of path extensions that connect to nodes within the hierarchical tree structure associated with a second layer in the hierarchical tree structure, wherein the second layer is associated with one more candidate object than the first layer, and determine, for a first path extension out of the subset of path extensions, a path metric associated with a first node in the second layer of the hierarchical tree structure, and determining a direction of arrival angle for a first candidate object associated with the first node using the path metric.

8. The automotive radar system of claim 7, wherein determining the subset of path extensions includes determining path extensions associated with matched filter response vectors having values greater than an average of all matched filter response vectors associated with nodes in the first layer of the hierarchical tree structure.

9. The automotive radar system of claim 7, wherein the automotive radar processor is configured to determine a beamforming spectrum of the residue value.

10. The automotive radar system of claim 7, wherein the automotive radar processor is configured to zero pad the first snapshot signal to length $N_\theta$ and process the first snapshot signal using a fast Fourier transform of length $N_\theta$, wherein $N_\theta$ defines a grid size of the direction of arrival analysis.

11. The automotive radar system of claim 7, wherein the automotive radar processor is further configured to:

determine the first path extension is associated with a value in the matched filter response vector that is greater than values in the matched filter response vector associated with other path extensions in the subset of path extensions;

calculating, for the second layer in the hierarchical tree structure, a second set of path variables, wherein the second set of path variables includes a residue value and a matched filter response vector based upon the residue value; and determining a second subset of second path extensions using the matched filter response vector out of a second set of path extensions that connect to nodes within the hierarchical tree structure associated with a third layer in the hierarchical tree structure and are associated with the first node in the second layer.

12. The automotive radar system of claim 7, wherein the automotive radar processor is configured to determine, for each path extension in the subset of path extensions, a path metric value.

13. The automotive radar system of claim 12, wherein the path metric values are determined by a deterministic maximum likelihood (DML) objective function of a node in the first layer that is associated with a corresponding path extension.

14. The automotive radar system of claim 13, wherein the automotive radar processor is configured to determine the path metric values associated with each of the path extensions in the subset of path extensions exceed a threshold value.

15. A method, comprising:

processing a received radar signal to generate a plurality of snapshot signals, wherein each snapshot signal in the plurality of snapshot signals is associated with a range-Doppler bin, determining a hierarchical tree structure, wherein each layer in the hierarchical tree structure is associated with a number of candidate objects and each node in the hierarchical tree structure is associated with a set of direction of arrival angles for the number of candidate objects determined by the layer of the hierarchical tree structure in which the node is located, selecting a first layer in the hierarchical tree structure, calculating, for the first layer in the hierarchical tree structure, a first set of path variables, wherein the first set of path variables includes a residue value and a matched filter response vector based upon the residue value, determining a subset of path extensions using the matched filter response vector out of a set of path extensions that connect to nodes within the hierarchical tree structure associated with a second layer in the hierarchical tree structure, wherein the second layer is associated with one more candidate object than the first layer, and determining, for a first path extension out of the subset of path extensions, a path metric associated with a first node in the second layer of the hierarchical tree structure; and determining a direction of arrival angle for a first candidate object associated with the first node using the path metric.

16. The method of claim 15, wherein determining the subset of path extensions includes determining path extensions associated with matched filter response vectors having values greater than an average of all matched filter response vectors associated with nodes in the first layer of the hierarchical tree structure.

17. The method of claim 15, wherein the path variables include a beamsteering matrix and further comprising calculating the matched filter response vector using an expression $A^H \underline{r}_k$ in which is $r_k$ the residue value and A is a beamsteering matrix.

18. The method of claim 15, further comprising zero-padding the snapshot signal to length $N_\theta$ and processing the snapshot signal using a fast Fourier transform of length $N_\theta$, wherein $N_\theta$ defines a grid size of the direction of arrival analysis.

19. The method of claim 15, further comprising:

determining the first path extension is associated with a value in the matched filter response vector that is greater than values in the matched filter response vector associated with other path extensions in the subset of path extensions;

calculating, for the second layer in the hierarchical tree structure, a second set of path variables, wherein the second set of path variables includes a residue value and a matched filter response vector based upon the residue value; and determining a second subset of second path extensions using the matched filter response vector out of a second set of path extensions that connect to nodes within the hierarchical tree structure associated with a third layer in the hierarchical tree structure and are associated with the first node in the second layer.

20. The method of claim 15, further comprising zero padding the first snapshot signal to length $N_\theta$ and processing the first snapshot signal using a fast Fourier transform of length $N_\theta$, wherein $N_\theta$ defines a grid size of the direction of arrival analysis.

\* \* \* \* \*